United States Patent
Yeh et al.

(10) Patent No.: US 11,725,083 B2
(45) Date of Patent: Aug. 15, 2023

(54) METHOD FOR FORMING CHITIN FILM

(71) Applicant: National Taiwan University, Taipei (TW)

(72) Inventors: An-I Yeh, Taipei (TW); Hsuan-Lun Chi, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 460 days.

(21) Appl. No.: 16/921,241

(22) Filed: Jul. 6, 2020

(65) Prior Publication Data
US 2021/0371601 A1 Dec. 2, 2021

(30) Foreign Application Priority Data
May 29, 2020 (TW) .................................. 109118073

(51) Int. Cl.
| | |
|---|---|
| C08J 3/12 | (2006.01) |
| C08J 5/18 | (2006.01) |
| B29C 39/00 | (2006.01) |
| C08J 3/00 | (2006.01) |
| C08J 5/00 | (2006.01) |
| C08J 5/08 | (2006.01) |

(52) U.S. Cl.
CPC ............... *C08J 3/12* (2013.01); *B29C 39/003* (2013.01); *C08J 5/18* (2013.01); *B29K 2005/00* (2013.01); *C08J 2305/08* (2013.01)

(58) Field of Classification Search
None
See application file for complete search history.

(56) References Cited

FOREIGN PATENT DOCUMENTS

| | | | | |
|---|---|---|---|---|
| CN | 108034061 | * | 5/2018 | ............... C08J 5/18 |
| CN | 108034061 | A | 5/2018 | |
| TW | 201012481 | A | 4/2010 | |

OTHER PUBLICATIONS

Zhang et al. (2012), Process and product properties of nano/submicron chitin and starch particles to form biofilms, Research results report Achievement Report, Nov. 6, 2010, (Year: 2010).*
CN-108,034,061 (Chen) May 2018 (online machine translation), [Retrieved on Jan. 6, 2023]. Retrieved from: Espacenet (Year: 2018).*
Phosphate Buffer. 2006, cshprotocols.cshlp.org/content/2006/1/pdb.rec8543.full? (Year: 2006).*
https://web.archive.org/web/20200513000355/https://en.wikipedia.org/wiki/Ball_mill (Year: 2020).*

(Continued)

*Primary Examiner* — Alison L Hindenlang
*Assistant Examiner* — Andrés E. Behrens, Jr.
(74) *Attorney, Agent, or Firm* — Kirton McConkie; Evan R. Witt

(57) ABSTRACT

A method for forming a chitin film is provided. The method includes the following steps. In a step (a), a chitin suspension is prepared by adding chitin to water. In a step (b), physical forces are provided to process the chitin suspension, so that a mean particle diameter of the chitin is reduced. In a step (c), the chitin suspension is applied to a target, and the chitin film is formed after the chitin suspension is dried.

14 Claims, 2 Drawing Sheets

(56) References Cited

OTHER PUBLICATIONS

MSE Supplies LLC. "Yttrium Stabilized Zirconia Beads and Milling Media Balls." MSE Supplies LLC, www.msesupplies.com/collections/yttrium-stabilized-zirconia-beads. Aug. 25, 2016 (Year: 2016).*

Michaud, David. "Ball Mill Critical Speed." Mineral Processing & Metallurgy, Jun. 19, 2015, www.911metallurgist.com/blog/ball-mill-critical-speed. (Year: 2015).*

Lehocký, Róbert, et al. "Scale-up From Batch to Flow-through Wet Milling Process for Injectable Depot Formulation." European Journal of Pharmaceutical Sciences, vol. 95, Elsevier BV, Dec. 2016, pp. 122-129. https://doi.org/10.1016/j.ejps.2016.08.043. (Year: 2016).*

Takacs. "Temperature of the Milling Balls in Shaker and Planetary Mills." SpringerLink, May 27, 2006, link.springer.com/article/10.1007/s10853-006-0312-4?error=cookies_not_supported&code=7e59c6bf-ff0a-42a2-9254-bf0248fbb2f9. (Year: 2006).*

Yeh et al. (2012), "Process and product properties of nano/submicron chitin and starch particles to form biofilms, Research results report (abbreviated version)," Special Research Program of the National Science Committee of the Executive Yuan, Achievement Report, Nov. 6, 2010, available to public on Nov. 6, 2012.

* cited by examiner

METHOD FOR FORMING CHITIN FILM

FIELD OF THE INVENTION

The present invention relates to a method for forming a biodegradable film, and more particularly to a method for forming a chitin film.

BACKGROUND OF THE INVENTION

Chitin is amino-polysaccharide and the second most abundant in nature. As known, chitin is widely present in crustacean shells, insect shells, marine invertebrates, mollusk endoskeletons, fungi, algae and yeast cell walls. That is, chitin is a biological material that has been found for a long time but has not been fully utilized. Generally, chitin is a long-chain polymer of N-acetylglucosamine units with β-1,4 glycosidic linkages. Depending on the source species, chitin is found in three crystalline polymorphic forms such as α, β and γ crystalline polymorphic forms.

Chitin is insoluble in water. Generally, chitin is only soluble in few solvents such as sodium hydroxide (NaOH) solution and N,N-dimethylacetamide (DMAc)/5% lithium chloride (LiCl) solution. However, the strong basicity of sodium hydroxide and the strong toxicity of dimethylacetamide both limit the applicability of chitin. Consequently, chitin is rarely used in food industries in the past. In recent years, chitin has been developed to produce high value-added foods with bioconversion, protect foods from microbial contamination, clarify and deacidify juice, purify water and produce biodegradable films. Chitin is also used for preparing chromatography columns, immobilizing enzyme, preparing paper-making adhesives and modifiers, preparing wound dressings and controlling drug release.

Conventionally, three methods were used to form the chitin film. Since chitin is insoluble in water, the most common method of forming the chitin film uses alkali to treat chitin and remove acetyl groups from chitin. When the degree of deacetylation is higher than 50%, the chitin is converted into chitosan. The chitosan can be further formed as chitosan film. For example, after 10% (v/v) sodium hydroxide is added to chitin and dissolved at room temperature for 104 hours, the alkali-treated chitin colloid solution is dried to form a film. The second method of forming the chitin film uses acid to treat chitin. For example, 3N hydrochloric acid is added to chitin to carry out acid hydrolysis at high temperature (104° C.) for 1.5 hours. At the acid hydrolysis end point, the mixture of hydrochloric acid and chitin is diluted with deionized water to pH 3. Then, the suspension is transformed from a coarse dispersion phase to a colloidal dispersion phase. After the suspension in the colloidal dispersion phase is dialyzed, a liquid-crystalline chitin suspension is obtained. After the liquid-crystalline chitin suspension is dried, the chitin film is formed. In accordance with the third method of forming the chitin film, N,N-dimethylacetamide/5% lithium chloride is added to chitin at a 0.5% (v/v) ratio. After the chitin gel is dried, the chitin film is formed.

As mentioned above, the methods of forming the chitosan film or the chitin film have some drawbacks. For example, the film has chemical solvent residues, and the finished product contains acids or alkalis. When the film is in contact with food or human skin, acid or alkali substances might migrate out from the film and contaminate foods. Moreover, N,N-dimethylacetamide is a highly toxic substance that is difficult to be used and unfriendly to human health and environment. Consequently, the above preparing methods limit the applications of the film.

For overcoming the drawbacks of the conventional technologies, the present invention provides an improved method for forming a chitin film in order to increase the safety and application of the chitin film.

SUMMARY OF THE INVENTION

An object of the present invention provides a method for forming a chitin film in order to increase the safety and application of the chitin film and increase the industrial application value of the chitin film.

In accordance with an aspect of the present invention, a method for forming a chitin film is provided. The method includes the following steps. In a step (a), a chitin suspension is prepared by adding chitin to water. In a step (b), physical forces are provided to process the chitin suspension, so that a mean particle diameter of the chitin is reduced. In a step (c), the chitin suspension is applied to a target, and the chitin film is formed after the chitin suspension is dried.

In the step (a), a solid content in the chitin suspension is in a range between 0.5% and 4.0% (w/w).

In an embodiment, the physical forces are provided through a milling process, and the step (b) is carried out in a wet type milling device.

In the step (b), a rotating speed of the wet type milling device is in a range between 1800 rpm and 3600 rpm, a circulation flow rate of transporting the chitin suspension is in a range between 200 mL/min and 800 mL/min, the chitin suspension is milled for a milling time in a range between 10 minutes and 180 minutes, and an operating temperature is in a range between 5° C. and 40° C.

In the step (b), a milling medium for performing the milling process includes a ball bead, and a diameter of the ball bead is smaller than 1.5 mm.

In the step (b), the mean particle diameter of the chitin is reduced to be in a range between 10 μm and 50 μm.

In an embodiment, the method further includes a step of adjusting the solid content of the chitin suspension to a specified solid content before the step (c). Preferably, the specified solid content is in a range between 0.5% and 3.0% (w/w).

In an embodiment, the step (c) is repeatedly performed many times, so that a thickness of the chitin film is adjustable.

In an embodiment, the target is a container or a mold. In the step (c), the milled chitin suspension is applied to the container or the mold through a casting process.

In the step (c), the milled chitin suspension is applied to the target through a coating process or a spraying process, or the target is immersed in the milled chitin suspension.

In accordance with another aspect of the present invention, a method for forming a chitin film is provided. The method includes the following steps. In a step (a), a chitin suspension is prepared by adding chitin to water, so that a solid content in the chitin suspension is in a range between 0.5% and 4.0% (w/w). In a step (b), physical forces are provided to process the chitin suspension, so that a mean particle diameter of the chitin is reduced. In a step (c), the chitin suspension is applied to a target, and the chitin film is formed after the chitin suspension is dried. In accordance with a feature, no acid substances, alkali substances or non-water solvents are used when the method is performed.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a method for forming a chitin film in order to increase the safety and application of the chitin film. In accordance with the present invention, a physical method is used to prepare the chitin film. During the process of preparing the chitin film, no acid substances, alkali substances or non-water solvents are used. Since acid substances, alkali substances or toxic substances are not retained, the safety of the chitin film is enhanced and the application of the chitin film is expanded.

Figure 1:
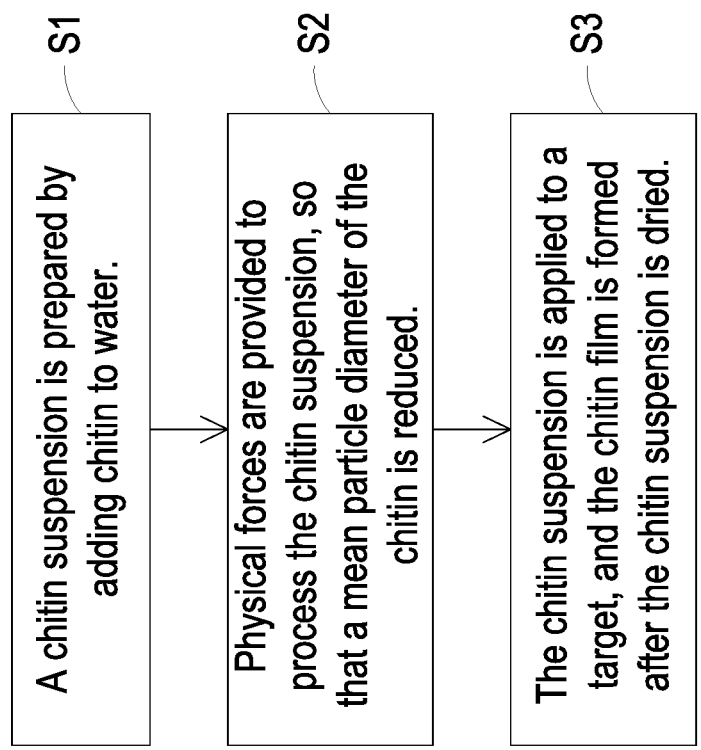
FIG. 1 is a flowchart illustrating a method for forming a chitin film according to an embodiment of the present invention.

FIG. 1 is a flowchart illustrating a method for forming a chitin film according to an embodiment of the present invention. The forming method comprises the following steps.

Firstly, a chitin suspension is prepared by adding chitin to water (Step S1). Then, physical forces are provided to process the chitin suspension, so that a mean particle diameter of the chitin is reduced (Step S2). Then, the chitin suspension is applied to a target, and the chitin film is formed after the chitin suspension is dried (Step S3). The implementations of the respective steps will be described in more details as follows.

In step S1, chitin powder is used as a raw material, and the chitin suspension is prepared by adding the chitin powder to water directly. In an embodiment, the chitin powder is α-chitin powder, which is the most popular chitin in nature. It is noted that the type of the chitin powder is not restricted. The chitin powder used in the present invention is added with water only. That is, the chitin powder is not subjected to deacetylation treatment. The degree of deacetylation of the chitin powder is lower than 50%, and the chitin powder is not soluble in weak acids. In other words, the chitin power is still chemically chitin rather than chitosan.

The solid content in the chitin suspension is in the range between 0.5% and 4.0% (w/w), preferably in the range between 1.0% and 2.5% (w/w), and more preferably in the range between 2.0% and 2.5% (w/w). For example, a chitin suspension with 1.0% (w/w) solid content is prepared by adding 5 grams of chitin powder to 500 mL of water and stirring the suspension.

In an embodiment, the physical forces in the step S2 are provided through a milling process. Preferably, the milling process is a wet milling process that is carried out in a wet type milling device. The milling medium for the wet milling process includes plural small ball beads. The diameter of the ball bead is smaller than 1.5 mm, e.g., in the range between 0.3 mm and 0.8 mm During the wet milling process, physical forces (e.g., shear force, impact forces and friction forces) are provided to particulate the substances (e.g., the chitin powder). In other words, the wet milling process has many advantages. For example, the wet milling process is easily operated, the structure of the associated machine is simple, the milling speed is fast, and the power consumption is low. Moreover, in comparison with the dry milling process, the wet milling process does not easily result in dust and high temperature. Preferably but not exclusively, the milling balls are yttrium-zirconium beads or ceramic beads.

Figure 2:
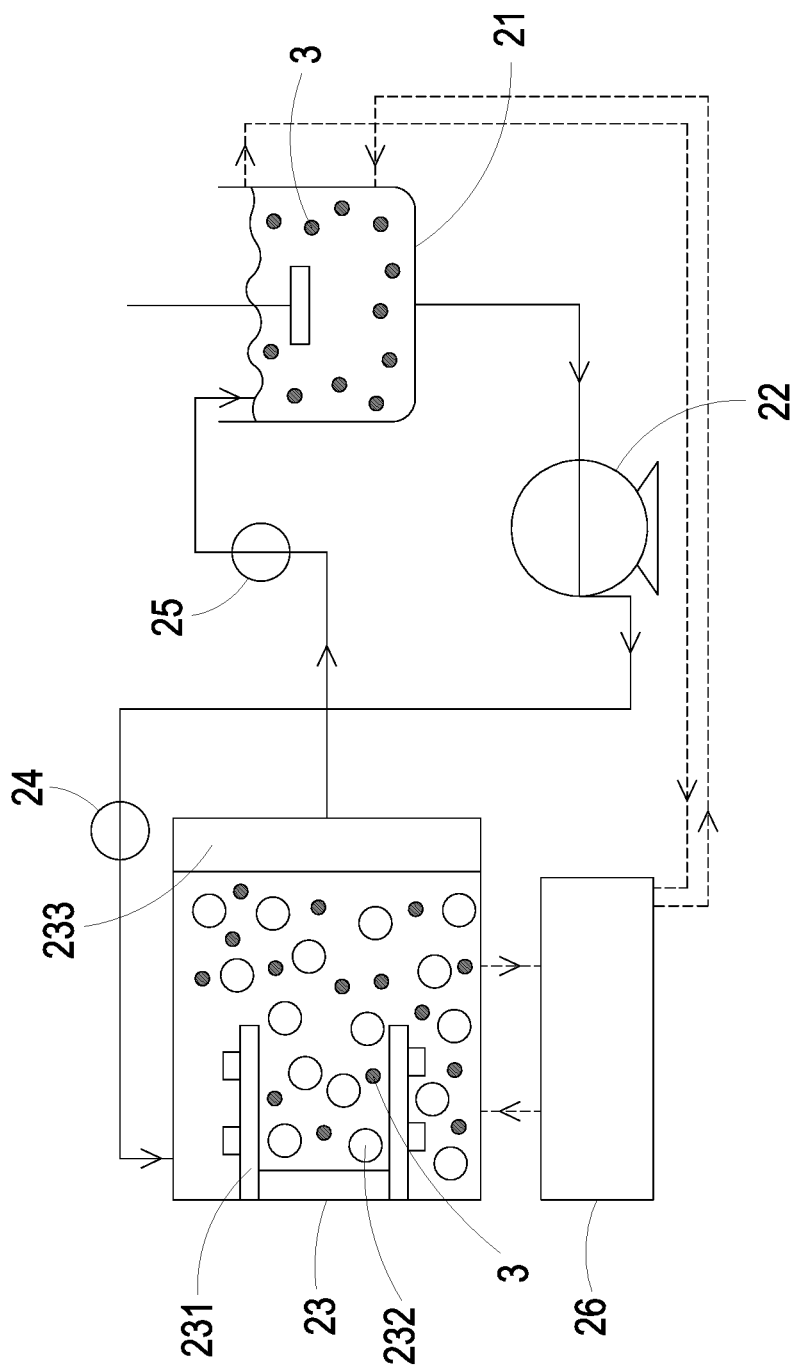
FIG. 2 schematically illustrates a wet type milling device for forming the chitin film according to the present invention.

FIG. 2 schematically illustrates a wet type milling device for forming the chitin film according to the present invention. As shown in FIG. 2, the wet type milling device 2 comprises a suspension premix tank 21, a peristaltic pump 22 and a milling chamber 23. The chitin suspension in the suspension premix tank 21 is stirred continuously. Consequently, the dispersion state of the chitin particles 3 in the chitin suspension is maintained, and the precipitation of the chitin particles 3 is avoided. The peristaltic pump 22 can cause a pressure difference for transporting the suspension in the suspension premix tank 21 to the milling chamber 23. The milling chamber 23 comprises a rotor 231, a milling medium 232 and a mesh screen 233. The milling medium 232 is driven by the rotor 231 to physically destroy the chitin particles 3. Consequently, the chitin particles 3 become smaller. In addition, the chitin particles 3 with the diameter smaller than the holes of the mesh screen 233 can be returned to the suspension premix tank 21 through the screen 233 for circulation. The wet type milling device 2 is further equipped with a pressure detector 24 and a temperature detector 25 for the operator to monitor the pressure and temperature in the milling chamber 23. Optionally, the wet type milling device 2 further comprises a cooler 26 to cool down the milling chamber 23 and the suspension premix tank 21 through a liquid cooling mechanism.

In some embodiments, the rotating speed of the rotor 231 in the milling chamber 23 is in the range between 1800 rpm and 3600 rpm, preferably in the range between 2400 rpm and 3200 rpm, and more preferably in the range between 2800 rpm and 3000 rpm.

In some embodiments, the circulation flow rate of the peristaltic pump 22 to transport the chitin suspension to the milling chamber 23 is in the range between 200 mL/min and 800 mL/min, preferably in the range between 300 mL/min and 600 mL/min, and more preferably in the range between 500 mL/min and 600 mL/min.

In some embodiments, the milling time in the range between 10 minutes and 180 minutes, preferably in the range between 20 minutes and 120 minutes, and more preferably in the range between 30 minutes and 60 minutes.

In some embodiments, the operating temperature of the milling chamber 23 is in the range between 5° C. and 40° C., preferably in the range between 10° C. and 25° C., and more preferably in the range between 15° C. and 20° C.

In some embodiments, the mean particle diameter of the chitin powder is in the range between about 200 μm and 240 μm. Preferably, the chitin powder is pretreated with a pulverizer before the step S1. After the mean particle diameter of the chitin powder is reduced to be in the range between 90 μm and 110 μm, the chitin suspension is prepared by adding the chitin powder to water. Then, the chitin suspension is subjected to the milling process.

After the chitin suspension is processed by the wet type milling device, the mean particle diameter of the chitin powder is reduced to be in the range between 10 μm and 50

µm, preferably in the range between 30 µm and 50 µm, and more preferably in the range between 40 µm and 50 µm.

The mean particle diameter of the chitin powder is determined according to the solid content of the chitin suspension, the circulation flowrate and the milling time. The experimental data about the mean particle diameter of the chitin powder under different milling conditions are listed in Table 1.

As shown in Table 1, the mean particle diameter of the chitin powder decreases with the increasing milling time. After the chitin suspension has been milled for 180 minutes, the mean particle diameter of the chitin powder is reduced to about 12~20 µm. As the circulation flowrate increases, the residence time of the chitin particle decreases. Consequently, the reduction extent of the mean particle diameter of the chitin powder decreases. Moreover, the solid content of the chitin suspension is in direct proportion to the milling efficiency (i.e., the reduction extent of the mean particle diameter). In case that the circulation flowrates are 200, 400 and 600 mL/min and the milling time is 180 minutes, the mean particle diameter of the chitin powder corresponding to the group with the solid content of 2.5% is smaller than the mean particle diameter of the chitin powder corresponding to the groups with the solid content 1.0%, 1.5% and 2.0%. It is reasonably speculated that the solid content of the chitin suspension affects the effective collision probability between the milling media. That is, the chitin suspension with the lower solid content needs a longer milling time.

weight, the solid content of the chitin suspension is calculated. According to the calculation result, deionized water is added. Consequently, the solid content of the chitin suspension is adjusted to the desired level. If the solid content of the milled chitin suspension is low, a portion of the water in the milled chitin suspension may be removed through a concentration equipment or oven. After the solid content of the chitin suspension is calculated, the solid content of the chitin suspension is adjusted to the desired level through dilution.

Then, in the step S3, the milled chitin suspension is applied to a target, and the chitin film is formed after the chitin suspension is dried. Preferably but not exclusively, the milled chitin suspension is applied to the target through a casting process, a coating process, a spraying process or an immersing process. For example, after the milled chitin suspension is directly poured into a container (or a mold) to undergo the casting process, the chitin film is formed in the container. Moreover, after the milled chitin suspension is coated or sprayed on the target or the target is immersed in the milled chitin suspension, a layer of chitin suspension is formed on the outer surface of the target. After the chitin suspension is dried, the chitin film is formed on the outer surface of the target.

In some embodiments, the step S3 is repeatedly performed may times. Consequently, multiple layers of chitin suspension are formed on the outer surface of the target. In such way, the thickness of the chitin film is increased. For

TABLE 1

| Circulation flowrate (mL/min) | Milling time (min) | Mean particle diameter (µm) Solid content | | | |
|---|---|---|---|---|---|
| | | 2.5% | 2.0% | 1.5% | 1.0% |
| 0 | 0 | | 98.86 ± 3.23 | | |
| 600 | 30 | 46.51 ± 0.76 | 43.62 ± 0.11 | 43.07 ± 0.31 | 40.70 ± 0.00 |
| | 60 | 39.49 ± 0.28 | 36.07 ± 0.25 | 37.77 ± 0.31 | 35.87 ± 0.06 |
| | 90 | 30.87 ± 0.71 | 27.15 ± 1.75 | 30.67 ± 0.42 | 28.67 ± 0.06 |
| | 120 | 21.95 ± 0.06 | 20.31 ± 0.13 | 22.60 ± 0.10 | 22.70 ± 0.10 |
| | 150 | 18.52 ± 0.88 | 19.00 ± 1.82 | 18.40 ± 0.10 | 18.20 ± 0.17 |
| | 180 | 15.63 ± 0.83 | 15.37 ± 0.55 | 15.33 ± 0.06 | 16.10 ± 0.17 |
| 400 | 30 | 38.40 ± 0.10 | 39.93 ± 0.31 | 45.34 ± 0.09 | 42.73 ± 0.06 |
| | 60 | 31.30 ± 0.20 | 31.53 ± 0.21 | 38.96 ± 0.05 | 36.83 ± 0.64 |
| | 90 | 21.20 ± 4.16 | 25.27 ± 0.15 | 36.96 ± 3.34 | 30.70 ± 0.10 |
| | 120 | 15.07 ± 0.47 | 22.27 ± 1.02 | 28.91 ± 4.00 | 28.77 ± 0.50 |
| | 150 | 12.70 ± 0.26 | 16.70 ± 1.71 | 21.60 ± 0.70 | 24.23 ± 0.67 |
| | 180 | 12.20 ± 0.46 | 15.37 ± 0.55 | 15.23 ± 1.36 | 20.13 ± 0.38 |
| 200 | 30 | 35.13 ± 0.06 | 39.60 ± 0.17 | 45.50 ± 0.16 | 45.07 ± 0.06 |
| | 60 | 21.10 ± 0.10 | 33.30 ± 0.36 | 37.36 ± 0.55 | 38.00 ± 0.10 |
| | 90 | 14.10 ± 0.20 | 26.27 ± 0.15 | 30.87 ± 0.63 | 33.10 ± 0.10 |
| | 120 | 11.20 ± 0.10 | 18.63 ± 1.33 | 27.18 ± 1.27 | 28.93 ± 5.44 |
| | 150 | 11.00 ± 0.36 | 13.47 ± 0.12 | 19.47 ± 0.06 | 21.87 ± 0.06 |
| | 150 | 11.00 ± 0.36 | 13.47 ± 0.12 | 19.47 ± 0.06 | 21.87 ± 0.06 |
| | 180 | 12.10 ± 0.36 | 12.20 ± 0.17 | 16.27 ± 0.06 | 18.43 ± 0.06 |

After the chitin suspension is subjected to the wet milling process, the chitin suspension is removed from the wet type milling device. Optionally, before the step S3, the solid content of the chitin suspension is adjusted to a specified solid content. In some embodiments, the specified solid content is in the range between 0.5% and 3.0% (w/w), preferably in the range between 0.75% and 1.5% (w/w), and more preferably in the range between 0.8% and 1.2% (w/w).

For example, since a chitin suspension sample with a high solid content has a good grinding efficiency, a chitin suspension with the solid content of 2.0% to 2.5% (w/w) is prepared and milled. After the chitin suspension is milled, 1 gram of the chitin suspension is taken and placed in an oven at 105° C. After the chitin suspension is dried to a constant example, the thickness of the chitin film is at least three times the thickness of the conventional chitin film. More especially, the chitin film formed by the method of the present invention has the thickness of several millimeters. In other words, the thickness of the chitin film formed by the method of the present invention is adjustable. Moreover, the chitin film can be formed on the target according to the shape of the target.

After the milled chitin suspension is dried, the chitin film is formed. The drying time is dependent on the drying temperature and the relative humidity. In some embodiments, the drying temperature is in the range between 1° C. and 100° C., preferably in the range between 20° C. and 45° C., and more preferably in the range between 25° C. and 30°

C. The relative humidity is in the range between 60% RH and 95% RH, preferably in the range between 75% RH and 90% RH, and more preferably in the range between 80% RH and 85% RH.

50~100 μm. The tensile strength and elongation of the chitin film are negatively correlated with the milling time. In other words, the physicochemical properties of the chitin film are adjustable according to the milling parameters.

TABLE 3

| Milling time (min) | Thickness (μm) | Water content (%) | Tensile strength (σ) (MPa) | Elongation (ε) (%) | Young's modulus (E) (MPa) | Water vapor permeability (g mm/m² day kPa) |
|---|---|---|---|---|---|---|
| 30 | 80.7 ± 11.0 | 4.98 ± 0.42 | 64.61 ± 10.31 | 2.16 ± 0.10 | 2994.18 ± 475.77 | 17.79 ± 0.49 |
| 60 | 76.0 ± 8.3 | 4.87 ± 0.51 | 61.78 ± 5.69 | 1.80 ± 0.45 | 3607.20 ± 1052.32 | 15.74 ± 1.04 |
| 90 | 63.3 ± 8.2 | 3.52 ± 0.59 | 38.95 ± 7.58 | 0.93 ± 0.23 | 4246.22 ± 346.28 | 13.00 ± 1.18 |
| 120 | 61.3 ± 5.2 | 2.79 ± 0.62 | — | — | — | 12.04 ± 1.55 |

The yield of the chitin film forming method of the present invention is very high. Since only about 5~10% of chitin is lost or retained in the milling device, the yield is in the range between 90% and 95%.

As mentioned above, the chitin film forming method of the present invention is very simple. After the chitin suspension of chitin powder and water is milled and the milled chitin suspension is dried, the chitin film is formed. Since the alkali treatment of removing the acetyl group, the acid treatment or the treatment of any other non-water solvent is not used during the film formation process, the chitin film forming method of the present invention is operated according to a physical film forming mechanism. When the chitin suspension is processed in the wet type milling device, the surficial structure of chitin is exfoliated, and the internal fiber structure is exposed. The exfoliated structure comprises larger insoluble fragments and smaller soluble components. The molecular weight of the soluble components is approximately in the range between 34.05 kDa and 95.45 kDa. During the drying process of the chitin suspension, the insoluble chitin particles will aggregate and stack with the fragments. The fragments can fill the gap between the stacked particles, a thin film is formed through the adhesion of the soluble components.

The relationships between the milling time and the percentage of soluble components in the milled chitin suspension are listed in the following Table 2. The soluble components can be used as the bonding agent between the insoluble components. As shown in Table 2, the percentage of the soluble components in the milled chitin suspension is about 1~3%. Even if the percentage of the soluble components is low, the chitin film can be formed. In contrast, the conventional film forming method requires that chitin is completely dissolved in acids, alkalis or other non-water solvents to increase the molecular force and increase the soluble components to help the film formation. In other words, the conventional film forming mechanism and the present film forming mechanism are distinguished.

TABLE 2

| Milling time (min) | Soluble component (%) |
|---|---|
| 30 | 1.47 ± 0.06 |
| 60 | 1.73 ± 0.11 |
| 90 | 2.02 ± 0.15 |
| 120 | 1.92 ± 0.03 |

The physicochemical properties of the chitin film formed by the method of the present invention are listed in Table 3. As shown in Table 3, the thickness of the chitin film is about As mentioned above, the chitin film forming method of the present invention does not use acids, alkalis or other non-water solvents. Consequently, the chitin film formed by the method of the present invention is a safe and non-toxic biological material, which can be used as the food packaging material or the material of containers. Moreover, the chitin film formed by the method of the present invention is edible. The chitin film can absorb moisture in the digestive system, increase the volume of food in the intestine and stomach, and increase satiety. Moreover, the chitin film can promote gastrointestinal motility, increase fecal volume and accelerate intestinal waste removal. Consequently, the chitin film can be further improved as health care food. Since chitin is the second most abundant natural polymer substance in the natural world, the raw material for use in the present invention is sufficient. Moreover, since chitin can be obtained from the discarded shrimp and crab shells, the chitin film forming method of the present invention is cost-effective.

Hereinafter, some examples of the chitin film forming method of the present invention and the applications will be described.

Example 1

Chitin powder were used as a raw material and added to water to prepare a 500 mL of 1.0% (w/w) chitin suspension. Then, the chitin suspension is milled in a wet type milling device. The wet type milling device is operated at a rotating speed of 3000 rpm and a circulation flowrate of 200 mL/min. After the chitin suspension has been milled for 60 minutes, the mean particle diameter of the chitin powder is reduced to about 38 μm. Then, 100 mL of the milled chitin suspension was taken out, poured into an iron pan with a dimension of 12×12×2.5 cm, and placed in an oven at 60° C. After the iron pan with the milled chitin suspension was dried in the oven for 8 hours, the iron pan was taken out. Consequently, a chitin film with a thickness of about 80 μm was formed.

Example 2

Chitin powder were used as a raw material and added to water to prepare a 500 mL of 2.0% (w/w) chitin suspension. Then, the chitin suspension is milled in a wet type milling device. The wet type milling device is operated at a rotating speed of 3000 rpm and a circulation flowrate of 400 mL/min. After the chitin suspension has been milled for 120 minutes, the mean particle diameter of the chitin powder is reduced to about 22 μm. Then, a paper cup with a volume of 270 mL and a cylindrical mold that matches the shape and size of the paper cup are provided. Then, 20 mL of the milled chitin suspension is taken out and poured into the paper cup. Then, the cylindrical mold is put into the paper cup. The cylindrical mold keeps a very small distance from the inner wall and bottom of the paper cup. Moreover, the cylindrical mold is fixed with a clamp. Then, the cylindrical mold and the paper cup were placed in an oven at 40° C. After the milled chitin suspension was dried in the oven for 10 hours, the cylindrical mold and the paper cup was taken out. Then, the cylindrical mold is detached from the paper cup. Meanwhile, the chitin film is formed on the inner wall and bottom of the paper cup.

Example 3

Chitin powder were used as a raw material and added to water to prepare a 500 mL of 2.0% (w/w) chitin suspension. Then, the chitin suspension is milled in a wet type milling device. The wet type milling device is operated at a rotating speed of 3000 rpm and a circulation flowrate of 400 mL/min. After the chitin suspension has been milled for 120 minutes, the mean particle diameter of the chitin powder is reduced to about 22 μm. Then, 500 mL of the milled chitin suspension is taken out and poured into a 1000 mL of container. Then, a fruit such as an orange, a strawberry or other fruit or food to be coated with a film was immersed in the milled chitin suspension. After the fruit has been immersed for 10 seconds, the fruit was taken out and air-dried for 1 hour. The above steps were repeatedly performed three times. Consequently, a chitin film was formed on a surface of the fruit.

Example 4

Chitin powder were used as a raw material and added to water to prepare a 500 mL of 2.5% (w/w) chitin suspension. Then, the chitin suspension is milled in a wet type milling device. The wet type milling device is operated at a rotating speed of 3000 rpm and a circulation flowrate of 600 mL/min. After the chitin suspension has been milled for 30 minutes, the mean particle diameter of the chitin powder is reduced to about 46 μm. Then, the milled chitin suspension is placed in a spraying device and sprayed to a surface of a meat or an aquatic product through a nozzle. Then, the meat or the aquatic product with the sprayed chitin suspension is put into a freezer. Consequently, an ice-coated chitin film is formed on the surface of the meat or the aquatic product in order to prevent from the water loss of the frozen product.

Example 5

Chitin powder were used as a raw material and added to water to prepare a 500 mL of 2.5% (w/w) chitin suspension. Then, the chitin suspension is milled in a wet type milling device. The wet type milling device is operated at a rotating speed of 3000 rpm and a circulation flowrate of 200 mL/min. After the chitin suspension has been milled for 120 minutes, the mean particle diameter of the chitin powder is reduced to about 12 μm. Then, a layer of the milled chitin suspension is coated on a mold. Then, the mold is placed in an oven. Before the milled chitin suspension is completely dried, a second layer of the milled chitin suspension is coated on the mold. The above steps are repeatedly done. Consequently, a uniform multilayered chitin film with a thickness in the range between 50 μm and 700 μm. For example, the multilayered chitin film can be used as a vibration diaphragm of a speaker.

As mentioned above, the milled chitin suspension can be applied to a target through diversified processes. In the first embodiment and the second embodiment, the milled chitin suspension is directly poured into the container through the casting process. After the milled chitin suspension is dried, the chitin film with the shape matching the inner chamber of the container is formed. In the third embodiment, the target is immersed in the milled chitin suspension, so that a layer of milled chitin suspension is coated on the surface of the target. In the fourth embodiment, the milled chitin suspension is sprayed to the target, so that a layer of milled chitin suspension is coated on the surface of the target. After the milled chitin suspension is dried, the chitin film is formed on the surface of the target. The above steps may be repeatedly performed many times. Consequently, the chitin film with a larger thickness can be formed (e.g., the fifth embodiment). In other words, the thickness of the chitin film formed by the method of the present invention is adjustable, and the chitin film can be formed on the target according to the shape of the target. The film forming method of the present invention can be used to form a planar chitin film. Moreover especially, the film forming method of the present invention can be used to form a three-dimensional chitin film. The chitin film forming method of the present invention does not use acids, alkalis or other non-water solvents. Consequently, the chitin film formed by the method of the present invention is safe, non-toxic and edible. Since the chitin film is biodegradable and environmentally-friendly, the chitin film can be widely applied to the food industry. For example, the chitin film formed by the method of the present invention can be used as a food packaging material. For food preservation, the outsides of fruits, vegetables, meats or aquatic products are wrapped by the chitin film of the present invention. Moreover, the chitin film of the present invention can be applied to the food container. For example, the chitin film can be used as the internal film of a coffee cup, a lunch box or an instant noodle bowl. Alternatively, the chitin film can be used as the packaging material of an instant noodle sauce or a brewing package. Under this circumstance, the instant noodle sauce or the brewing package can be directly thrown into the hot water without the need of separating the packaging material.

Moreover, the chitin film formed by the method of the present invention has low water vapor permeability (see Table 3). Consequently, the chitin film can be applied to many products. The uses of the chitin film are very wide and not limited to food, food packaging materials or container. For example, the chitin film formed by the method of the present invention can be used as a vibration diaphragm of a speaker, a wound dressing or a planting container. The applications of the chitin film are not restricted.

From the above descriptions, the chitin film forming method of the present invention uses the physical treatment to process the chitin suspension. After the chitin suspension is milled and the milled chitin suspension is dried, the chitin film is formed. The chitin film forming method of the present invention does not use acids, alkalis or other non-water solvents. Consequently, the chitin film formed by the method of the present invention is safe, non-toxic and edible. Since the chitin film is biodegradable and environmentally-friendly, the chitin film can be widely applied to the food industry or other industries. Moreover, the chitin film is cost-effective. Moreover, the thickness of the chitin film formed by the method of the present invention can be adjusted, and the chitin film can be formed on the target according to the shape of the target. Moreover, the physicochemical properties of the chitin film are adjustable according to the milling parameters. Consequently, the use of the chitin film forming method of the present invention can increase the safety and application of the chitin film.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for forming a chitin film, the method comprising steps of:
    (a) preparing a chitin suspension by adding chitin to water;
    (b) milling the chitin suspension, so that a mean particle diameter of the chitin is reduced to be in a range between 10 μm and 50 μm; and
    (c) applying the chitin suspension to a target, and forming the chitin film after the chitin suspension is dried,
    wherein no acid substances, alkali substances or non-water solvents are used when the method is performed.

2. The method according to claim 1, wherein in the step (a), a solid content in the chitin suspension is in a range between 0.5% and 4.0% (w/w).

3. The method according to claim 1, wherein the step (b) is carried out in a wet type milling device.

4. The method according to claim 3, wherein in the step (b), a milling medium for performing the milling process includes a ball bead, and a diameter of the ball bead is smaller than 1.5 mm.

5. The method according to claim 3, wherein in the step (b), a rotating speed of the wet type milling device is in a range between 1800 rpm and 3600 rpm.

6. The method according to claim 3, wherein in the step (b), a circulation flow rate of transporting the chitin suspension is in a range between 200 mL/min and 800 mL/min.

7. The method according to claim 3, wherein in the step (b), the chitin suspension is milled for a milling time in a range between 10 minutes and 180 minutes.

8. The method according to claim 3, wherein in the step (b), an operating temperature is in a range between 5° C. and 40° C.

9. The method according to claim 1, further comprising a step of adjusting the solid content of the chitin suspension to a specified solid content before the step (c), wherein the specified solid content is in a range between 0.5% and 3.0% (w/w).

10. The method according to claim 1, wherein the step (c) is repeatedly performed many times, so that a thickness of the chitin film is adjustable.

11. The method according to claim 1, wherein in the step (c), the milled chitin suspension is applied to the target through a coating process or a spraying process.

12. A method for forming a chitin film, the method comprising steps of: (a) preparing a chitin suspension by adding chitin to water, so that a solid content in the chitin suspension is in a range between 0.5% and 4.0% (w/w); (b) the chitin suspension so that a mean particle diameter of the chitin is reduced; wherein in the step (b), the mean particle diameter of the chitin is reduced to be in a range between 10 μm and 50 μm, and (c) applying the chitin suspension to a target, and forming the chitin film after the chitin suspension is dried, wherein no acid substances, alkali substances or non-water solvents are used when the method is performed.

13. The method according to claim 12, further comprising a step of adjusting the solid content of the chitin suspension to a specified solid content before the step (c), wherein the specified solid content is in a range between 0.5% and 3.0% (w/w).

14. The method according to claim 12, wherein the step (c) is repeatedly performed many times, so that a thickness of the chitin film is adjustable.

* * * * *